US008244458B1

(12) United States Patent
Blackburn

(10) Patent No.: US 8,244,458 B1
(45) Date of Patent: Aug. 14, 2012

(54) HOST-CENTRIC METHOD FOR AUTOMOBILE COLLISION AVOIDANCE DECISIONS

(75) Inventor: Michael R. Blackburn, Encinitas, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1085 days.

(21) Appl. No.: 12/145,670

(22) Filed: Jun. 25, 2008

Related U.S. Application Data

(63) Continuation-in-part of application No. 12/144,019, filed on Jun. 23, 2008.

(51) Int. Cl.

| | |
|---|---|
| ***G06F 17/10*** | (2006.01) |
| ***G06F 7/00*** | (2006.01) |
| ***G06F 7/70*** | (2006.01) |
| ***G06F 19/00*** | (2011.01) |
| ***A01B 69/00*** | (2006.01) |
| ***B60R 22/00*** | (2006.01) |
| ***B60T 7/12*** | (2006.01) |
| ***G01C 21/00*** | (2006.01) |
| ***G05D 1/02*** | (2006.01) |
| ***B60Q 1/00*** | (2006.01) |
| ***G08G 1/16*** | (2006.01) |
| ***G08G 1/00*** | (2006.01) |
| ***G01S 13/00*** | (2006.01) |
| ***G01S 13/58*** | (2006.01) |
| ***G01S 7/40*** | (2006.01) |
| ***G01S 3/02*** | (2006.01) |

(52) U.S. Cl. ................ 701/301; 701/3; 701/36; 701/41; 701/45; 701/70; 701/96; 701/117; 701/300; 340/435; 340/436; 340/438; 340/903; 340/904; 342/70; 342/71; 342/107; 342/174; 342/455

(58) Field of Classification Search ................ 701/3, 36, 701/41, 45, 70, 96, 117, 213, 301, 300; 340/70, 340/435, 436, 438, 903, 904, 961; 280/735; 342/70, 71, 107, 174, 455
See application file for complete search history.

(56) References Cited

U.S. PATENT DOCUMENTS

| | | | |
|---|---|---|---|
| 5,467,072 | A | 11/1995 | Michael |
| 6,859,731 | B2 | 2/2005 | Takafuji et al. |
| 6,889,786 | B2 | 5/2005 | Watanabe et al. |

(Continued)

OTHER PUBLICATIONS

Fiorini, P. and Schiller, Z., Motion Planning in Dynamic Environments Using the Relative Velocity Paradigm, Journal, 1993, pp. 560-565, vol. I, Proceedings of the IEEE International Conference on Automation.

(Continued)

*Primary Examiner* — James Trammell
*Assistant Examiner* — Majdi Alsomiri
(74) *Attorney, Agent, or Firm* — Arthur K. Samora; Kyle Eppele

(57) ABSTRACT

A method of quantifying a host vehicle's collision risk with a foreign object includes the steps of collecting and preserving a short-term history of range and azimuth data on the object and identifying leading edges of the foreign object. The leading edges are linked to previous detected leading edges in the short term history storage data to define a trajectory for the object, and to calculate range and azimuth velocities and accelerations of leading edges of the foreign object based on the leading edge trajectory. A collision risk P is then calculated for the foreign object using the range and azimuth velocities and accelerations according to a predetermined formula. If the collision risk P falls below a pre-set value, the methods of the present invention calculate an evasive maneuver for the host vehicle based on a vector sum of high risk leading edge risks and locations.

6 Claims, 4 Drawing Sheets

U.S. PATENT DOCUMENTS

| | | | | |
|---|---|---|---|---|
| 6,926,374 | B2 * | 8/2005 | Dudeck et al. | 303/191 |
| 6,940,448 | B2 * | 9/2005 | Knoop et al. | 342/70 |
| 7,016,783 | B2 | 3/2006 | Hac et al. | |
| 2005/0134440 | A1 * | 6/2005 | Breed | 340/435 |
| 2005/0273263 | A1 * | 12/2005 | Egami et al. | 701/301 |
| 2007/0021915 | A1 * | 1/2007 | Breed et al. | 701/301 |
| 2007/0032914 | A1 * | 2/2007 | Kondoh et al. | 701/1 |
| 2007/0165910 | A1 * | 7/2007 | Nagaoka et al. | 382/104 |
| 2007/0288133 | A1 * | 12/2007 | Nishira et al. | 701/23 |
| 2008/0027591 | A1 * | 1/2008 | Lenser et al. | 701/2 |
| 2008/0071492 | A1 * | 3/2008 | Skvortsov et al. | 702/92 |
| 2008/0167821 | A1 * | 7/2008 | Breed | 701/301 |
| 2008/0189040 | A1 * | 8/2008 | Nasu et al. | 701/301 |
| 2009/0271054 | A1 * | 10/2009 | Dokken | 701/21 |

OTHER PUBLICATIONS

Fiorini, P. and Schiller, Z., Motion Planning in Dynamic Environments Using Velocity Obstacles, Journal, 1998, pp. 760-772, vol. 17, International Journal of Robotics Research.
Yung N,H,C, and Ye, C., Avoidance of Moving Obstacles Through Behavior Fusion and Motion Prediction, Journal, 1998, pp. 3424-3429, Proceedings of IEEE International Conference on Systems, Man, and Cybernetics, San Diego, California.
Fujimori, A. and Tani, S., A Navigation of Mobile Robots with Collision Avoidance for Moving Obstacles, Journal, 2002, pp. 1-6, IEEE ICIT'02, Bangkok, Thailand.

* cited by examiner

| | CONSTANT AZIMUTH | CHANGING AZIMUTH |
|---|---|---|
| DECELERATING RANGE | MODERATE | LOW |
| CONSTANT/ ACCELERATING RANGE | HIGH | MODERATE |

HOST-CENTRIC METHOD FOR AUTOMOBILE COLLISION AVOIDANCE DECISIONS

CROSS REFERENCE TO RELATED APPLICATION

This patent application is a Continuation-In-Part of, and claims priority from, U.S. patent application Ser. No. 12/144,019 filed Jun. 23, 2008 by Michael R. Blackburn entitled "A Method for Determining Collision Risk for Collision Avoidance Systems." The disclosure of the prior application is hereby incorporated by reference herein in its entirety

FEDERALLY-SPONSORED RESEARCH AND DEVELOPMENT

This invention (Navy Case No. 98,722) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

FIELD OF THE INVENTION

The method disclosed is related to collision avoidance systems in a host vehicle.

BACKGROUND

Collision avoidance methods currently employed in automobile adaptive cruise control (ACC) systems use radio detection and ranging (RADAR) or light detection and ranging (LIDAR) to measure range to targets from the front of the equipped vehicle. Because braking distance is in part a function of the equipped vehicle speed, the determination of collision risk in ACC is based at least partly on target range and equipped vehicle speed information. Higher equipped vehicle speeds require longer ranges to targets before the ACC intervenes to reduce vehicle speed. If the range is reduced by the introduction of a new target vehicle in front of the vehicle, speed is reduced to increase the range or stand-off distance.

Although the ACC method may reduce rear-end collisions by the equipped vehicle with a target vehicle in front (at zero azimuth), it is insensitive to vehicles at all other azimuths. The ACC method will not help prevent collisions resulting from laterally or obliquely approaching vehicles, as can occur at intersections or during lane changes. The absence of an omni-directional risk assessment is a deficiency common to all forward-looking ACC systems, and common as well to most human drivers, as human drivers suffer from an inability to visually attend to more than one event at a time. Human omni-directional risk assessment also suffers from the requirement to expend time in the shifting of attention between events. Thus, human drivers often get involved in accidents because they are paying attention to the wrong event, and because they often make mistakes in the determination and execution of the most appropriate avoidance response. This is particularly true when more than one critical obstacle event is involved.

SUMMARY

The present invention overcomes these disadvantages because it automatically determines the optimal control decisions to be executed by a host vehicle to avoid collisions with critical obstacles, both fixed and moving, in the entire surroundings of the host vehicle if possible, otherwise to minimize the collision velocities with obstacles closing at any and all azimuths relative to the host vehicle if collision avoidance is not possible. Control decisions may involve changes in host vehicle direction and/or speed. Critical obstacles are defined as objects that pose a high collision risk. The host vehicle is defined as a vehicle which has organic collision avoidance sensors, the control processes described herein, and the mechanisms to automatically execute the resulting control commands. This invention also provides a method that can coexist with a human driver and intervene only when the driver fails to avoid critical obstacles. The methods disclosed herein quantify collision risk assessments from a risk assessment process simultaneously for a plurality of azimuth locations in the surrounding of a host vehicle and automatically determine the steering and acceleration/deceleration decisions required by the host vehicle to avoid, or if a collision avoidance maneuver is even possible, after evaluating all critical moving or stationary obstacles that are detected within the host's organic sensor range. If no avoidance maneuver is possible, then the net decision will yield an avoidance maneuver that results in minimum collision velocities, which further results in minimal damage to the host vehicle and the object.

BRIEF DESCRIPTION OF THE DRAWINGS

The novel features of this invention will be best understood from the accompanying drawings, taken in conjunction with the accompanying description, in which similarly-referenced characters refer to similarly referenced parts, and in which.

DETAILED DESCRIPTION

In brief overview, the methods of the present subject matter involve the following processes and/or steps, each of which is defined and explained in subsequent paragraphs: collecting and preserving a short-term history of sensor data; identifying leading edges in the azimuth neighborhoods of sensor returns; linking the most recently detected leading edges individually to the most likely leading edge locations in the prior sample to define relative trajectories of the objects; calculating range and azimuth velocities and accelerations of leading edges based on the leading edge trajectories; quantifying collision risk of the leading edges; calculating host vehicle steering and acceleration/deceleration commands based on leading edge risks and locations; and executing host vehicle control commands.

Figure 1:
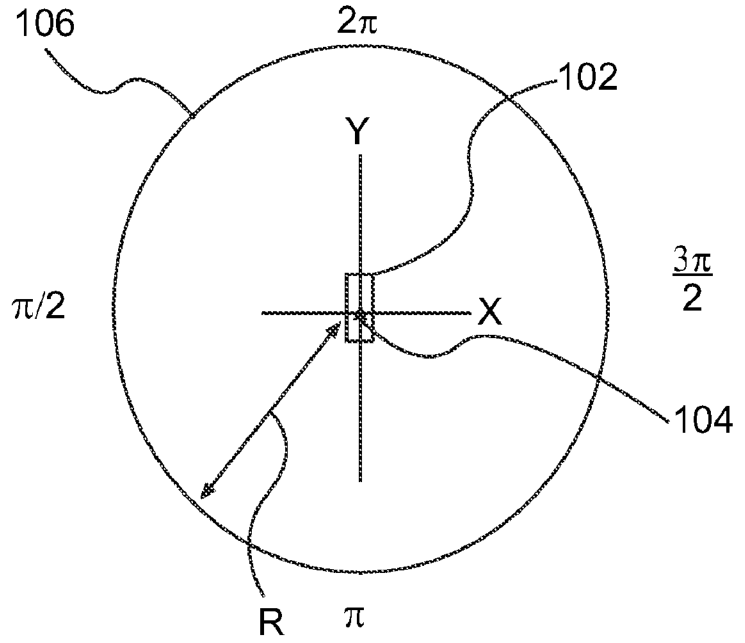
FIG. 1 illustrates a host vehicle and its sensor coverage.

With respect to the process of collecting and preserving a short-term history of sensor data, FIG. 1 depicts a host vehicle 102 with conventional front-wheel steering located at the center of its sensor coverage map. A host vehicle sensor provides range R and azimuth information for the circumference out to a maximum range indicated by the circle 106 in the figure. Arrow 104 indicate that the forward direction of the host vehicle 102. Azimuth and range resolution are sensor dependent, but for purposes of this disclosure and the examples herein, the azimuth and range resolutions are arbitrarily set at $6.283\times10^{-3}$ radians on the circumference, and at 0.33 m up to the range of 333 m, respectively. The update rate of the sensor is set at 10 Hz for the illustrative examples given herein. Higher sensor update rates, greater sensor range and greater sensor azimuth resolution improve the effectiveness of the methods described herein.

Range and azimuth information is saved on each cycle in a range-data buffer. The range and azimuth information are mapped for convenience to elements in a matrix based on the azimuth resolution. For example, using the model resolutions above, the matrix would involve 1024 elements (bins) indexed by azimuth. The number of bins is directly related to the azimuth resolution. In the present example, each bin contains returns from a region of the circumference encompassing approximately ⅓ of a degree of regard.

The one-dimensional vector of object ranges detected across the different azimuths may be replicated and saved for as many time samples as are desired to preserve the history of the environment. Doing so creates a matrix of range data for each azimuth and time sampled. At a minimum, three time samples are preserved. This minimal history (of three data points) permits a very short term estimate of the obstacle's relative trajectory with respect to the host vehicle. At each new time sample of sensor returns, the most recent sample is shifted to the next row of the matrix. Table 1a displays an example of a time (t) versus azimuth (Θ) matrix of range data. Table 1a provides an exemplary format by which the range data could be stored by azimuth around the circumference for four different time samples (although there is no data stored in Table 1a). Note that the azimuth data in any row of the matrix are continuous so that comparisons of azimuth changes can be made by wrapping around the row:

TABLE 1a

| t vs. Θ | π | - - - | π/2 | - - - | π | - - - | 3π/2 | - - - | 2π |
|---|---|---|---|---|---|---|---|---|---|
| t | | | | | | | | | |
| t − 1 | | | | | | | | | |
| t − 2 | | | | | | | | | |
| t − 3 | | | | | | | | | |

In the neighborhood of any azimuth (Aπ, in the example matrix below, where A is a constant peculiar to the location of the nearest point in a neighborhood) the range data, in meters, might appear as in Tables 1b-1e. In the example of Table 1b, the object range is 321 meters at t, and, because no returns were detected at Aπ+/−(π/512) at a range of 321 m, we would conclude that the target was less than 2 meters in cross section, consistent with a small motor vehicle. Given our known sampling rate of 10 Hz, we would conclude that the object was approaching (or closing with) the host vehicle at a constant velocity of 30 m/sec (approximately 65 mph).

TABLE 1b

| Time vs. Θ | Aπ + 3(π/512) | Aπ + 2(π/512) | Aπ + (π/512) | Aπ | Aπ − (π/512) | Aπ − 2(π/512) | Aπ − 3(π/512) |
|---|---|---|---|---|---|---|---|
| t | | | | 321 | | | |
| t − 1 | | | | 324 | | | |
| t − 2 | | | | 327 | | | |
| t − 3 | | | | 330 | | | |

In the example of Table 1c, the object range is 20 meters at t, and produced returns with gradually increasing ranges in the immediate azimuth neighborhood. The azimuth neighborhood consists of the sensor returns stored in the bins on both sides of a specified azimuth location from any one time sample (row in the tables). The size of the azimuth neighborhood that is considered decreases with range as described below. In the example of Table 1c, the range returns remained constant in the immediate history indicating that an object is moving parallel with the host at a relatively close range. At this range, the length of the object is undetermined, but one edge is apparently located in the bin at Aπ−3(π/512) because there is not data in that column (implying no sensor return because there is not object to generate a sensor return, and because there is sensor return data in the adjacent Aπ−2(π/512).

TABLE 1c

| Time vs. Θ | Aπ + 3(π/512) | Aπ + 2(π/512) | Aπ + (π/512) | Aπ | Aπ − (π/512) | Aπ − 2(π/512) | Aπ − 3(π/512) |
|---|---|---|---|---|---|---|---|
| t | 21.66 | 21.33 | 21 | 20 | 20.33 | 21 | |
| t − 1 | 21.66 | 21.33 | 21 | 20 | 20.33 | 21 | |
| t − 2 | 21.66 | 21.33 | 21 | 20 | 20.33 | 21 | |
| t − 3 | 21.66 | 21.33 | 21 | 20 | 20.33 | 21 | |

In the example of Table 1d, an object is moving obliquely relative to the host vehicle.

TABLE 1d

| Time vs. Θ | Aπ + 3(π/512) | Aπ + 2(π/512) | Aπ + (π/512) | Aπ | Aπ − (π/512) | Aπ − 2(π/512) | Aπ − 3(π/512) |
|---|---|---|---|---|---|---|---|
| t | | | 234.33 | 234 | | | |
| t − 1 | | | | 237 | | | |
| t − 2 | | | | | 240 | | |
| t − 3 | | | | | | 243 | |

In the example Table 1e, an object is moving obliquely relative to the host vehicle as before and now is occluding a more distant object located initially at 332 meters. The large range changes at azimuth Aπ−(π/512) suggest that two objects are present for it is unlikely that one road-bound object could traverse 92 meters (332−240) in $1/10^{th}$ of a second:

TABLE 1e

| Time vs. Θ | Aπ + 3(π/512) | Aπ + 2(π/512) | Aπ + (π/512) | Aπ | Aπ − (π/512) | Aπ − 2(π/512) | Aπ − 3(π/512) |
|---|---|---|---|---|---|---|---|
| t | | | 234.33 | 234 | | 320 | |
| t − 1 | | | | 237 | 324 | | |
| t − 2 | | | | | 240 | | |
| t − 3 | | | | | 332 | 243 | |

Tables 1b-1e represent different scenarios under which sensor data is preserved by a processor or similar type structure of a short period of time (four cycles). After collection and preservation of short-term history of sensor data as described above, the methods of the present invention include identifying leading edges in neighborhoods of sensor returns, as a nearby object will present a mass of radar returns against an open background. Generally the mass will have a narrow variance of ranges with a confined most proximate region relative to the host, called here the "leading edge". A leading edge is evident in the example of Table 1c at azimuth Aπ.

It is possible for the method to discriminate objects that provide range and azimuth returns to the host's sensors, for a critical concern is navigation through free space on the driving plane. But free space is defined only when the host vehicle can move in a particular direction without colliding with existing objects located in that direction. A prelude to any collision is a significant decrease in range at a particular azimuth that defines the direction of interest.

In the example of Table 1e, two objects are providing returns in close azimuth proximity but at significantly different ranges. The range and azimuth changes indicate that a safe passage is opening at azimuth $A\pi-(\pi/512)$ should the control system need to take that option.

Figure 2:
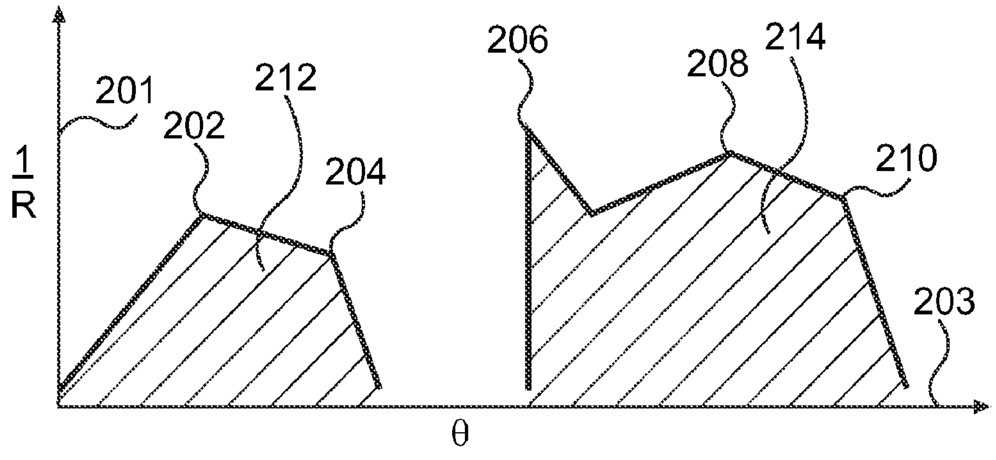
FIG. 2 is a graphic example of a radar range profile demonstrating definitions of leading edges.

FIG. 2 graphically represents the range returns across the azimuth vector from a RADAR scan of a hypothetical environment containing obstacles at different ranges. In FIG. 2, the ordinate axis 201 represents the azimuth of the foreign object from the host vehicle ($\Theta=n\pi$). The abscissa axis 203 is mapped as the inverse of the range from the host vehicle to the foreign object ($y=1/R$). In FIG. 2, shaded areas 212 and 214 represent different objects. In shaded area 212, point 202 represents a leading edge, while point 204 does not. For shaded area 214, points 206 and 208 represent leading edges, while point 210 does not. A leading edge is thus defined as a region in a neighborhood of returns in which successively bi-lateral points increase in range. Because the range is mapped in FIG. 2 as 1/R (and points 202, 206 and 208 are local maximums in FIG. 2), another way to state this is that a leading edge is a local range minimum.

While object segmentation can be accomplished using a combination of range and azimuth data, there will be many situations in which it is not possible to do so. The algorithm will not fail under these circumstances, however, because the data can be then interpreted as loosely coupled objects that pose a collision risk when considered as a group, such as a cluster of people at a crosswalk. The collision avoidance algorithm should then be responsive to the dominant leading edge whether formed from one or several independent objects, for again it would be the leading edge which would be encountered first in a collision.

The leading edge of any object or any group of independent objects is a critical determinant of collision risk at any moment in time, for that leading edge will be the first to collide with the host vehicle if it is on a collision course. The leading edge is by definition the point that is closest to the host vehicle.

Because nearby objects will span a greater angle than distant objects of the same size, we must increase the size of the azimuth neighborhood in which a leading edge is identified as the object range decreases. One method to define the radius of the azimuth neighborhood is as follows:

$$\text{radius}=F*(G-\tan h(\text{range}/\text{MDR})) \quad [1]$$

where MDR is the maximum detection range, and F and G are constants representing the largest neighborhood anticipated when the range is very small and the smallest neighborhood anticipated when the range is very large, respectively.

Figures 3, 4:
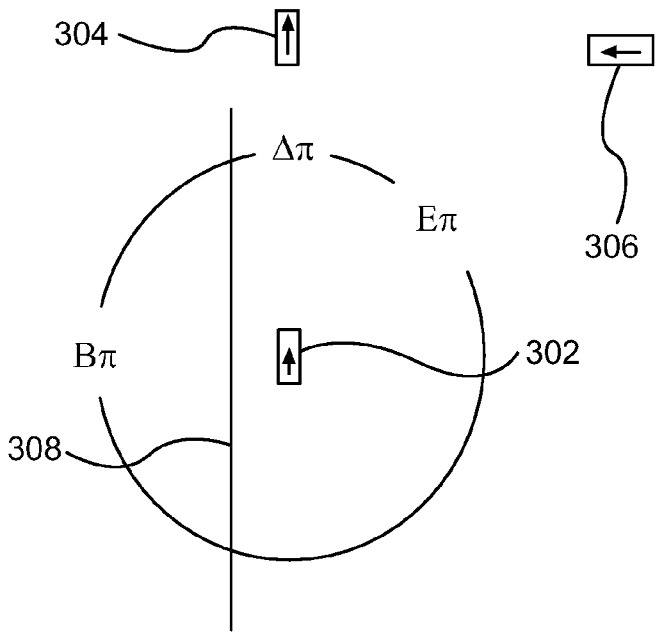
FIG. 3 illustrates a host vehicle and sensor coverage, with three foreign objects evident in the sensor returns.
FIG. 4 is a chart showing collision risk as a function of range from host vehicle.

Referring now to FIG. 3, consider an associated radar time/azimuth matrix of the leading edges as listed in Table 2 below:

TABLE 2

| Time vs. | Aπ | - - - | Bπ | - - - | Δπ | - - - | Eπ | Φπ |
|---|---|---|---|---|---|---|---|---|
| t | | | 3 | | 22.33 | | 28 | |
| t − 1 | | | 3 | | 21 | | 32 | |
| t − 2 | | | 3 | | 21.6 | | 36 | |
| t − 3 | | | 3 | | 22 | | 40 | |

In the example of FIG. 3 and its associated Table 2, three objects, 304, 306 and 308 are clearly evident in the returns. Two of the objects, 304 and 306, are approaching the host vehicle 302 with locations during time t at $\Delta\pi$ and $E\pi$, respectively. Note that each object would likely have side returns, but these are not of immediate concern as they are not defined as neighborhood leading edges. Although object 304 is actually closer to host vehicle 302 than object 306, the leading edge of the object 306 at location $E\pi$ is more critical because of its more rapid rate of closure and unchanging azimuth. The range closure of object 304 is indeterminate over the short-term history of the data storage. The range of the leading edge of the object 308 at $B\pi$ is unchanging and thus poses little immediate risk, as would be the return from a guard rail for example. In this case, the returns indicate regions of the surroundings in which free drive space is unavailable.

Once a history of sensor data is established and leading edges are identified, the leading edges in the azimuth neighborhoods (the entries next to each other in the data bins) are linked to leading edges from prior cycles to define relative trajectories of sensed objects. This involves linking the most recently detected leading edges to the history of leading edge locations. In other words, assessment of the movement of the leading edge involves looking backward in time for the last location of the leading edge as defined by range and azimuth. Looking at the azimuth vector at time t−1 for locations where the leading edge might have been is easy if there were not other leading edges in the neighborhood. If there were other leading edges, then some criterion must be applied to assign points from t−1 to points at t. With a high sampling rate, the criterion of minimal movement can be applied. However, the leading edges of objects at close ranges to the host can move more quickly than the leading edges of objects at more distant ranges. All leading edges are limited by the laws of physics to certain maximum angular velocities as they are to certain range velocities, but these limits are range dependent and azimuth location dependent while both the object and the host vehicle are moving.

In general, the certainty that two data points represent the same object is a function of their geometric distance. The distance or change in location is found by using the cosine law for side-angle-side. The angle is the difference in their azimuths from one sample to the next, and the two sides are their ranges. Therefore the change in location of a foreign object is represented as:

$$\text{location change}=\sqrt{(\text{range}_1^2+\text{range}_2^2-2.0*\text{range}_1*\text{range}_2*\cos(\text{abs}(\Theta_1-\Theta_2)))}. \quad [2]$$

In practice, the comparisons are only made between the leading edge locations at time t and time t−1, and then are linked to and preserved with the leading edge location as the data are shifted backwards in the range data matrix on each sample update. A trajectory is evident from this succession of links.

The search for the most likely leading edge at t−1 to link with a leading edge at t is performed using the same range-based neighborhood radii calculations as in equation [1] for the identification of leading edges. The comparison with the smallest distance indicative of the smallest change in location is identified as the link.

With respect to the fourth process, calculating ranges velocities, range accelerations, azimuth velocities and azimuth accelerations of leading edges based on the recent history, a simple way to assess range and azimuth (angular)

velocities is to compare the locations of the linked leading edges across sequential time samples, as follows:

$$RV_t = \text{range velocity} = R_{t-1} - R_t$$

$$RA_t = \text{range acceleration} = RV_{(t,\,t-1)} - RV_{(t-1,\,t-2)}$$

$$\Theta V_t = \text{azimuth velocity} = \text{abs}(\Theta_{(t-1)} - \Theta_t)$$

$$\Theta A_t = \text{azimuth acceleration} = (\Theta V_{(t-1,\,t-2)} - \Theta V_{(t,\,t-1)})$$

where $R_t$=range at time t and where $\Theta_t$=target azimuth at time t. In this manner, range and azimuth velocities and accelerations are calculated for further use in quantify a collision risk as discussed below.

The methods of the present invention further include the step of quantifying a collision risk of leading edges. Collision risk is a prediction of future behavior based on past behavior. But because predictions about an object's future trajectory are suspect due to the free agency of the object's controller and other uncertainties in the environment such as road conditions, the present trajectory can only be estimated by its recent history.

Those objects that are approaching the host present a collision risk while those that are receding present no collision risk. The directness of the approach, and thus the collision risk, will be expressed in the rate of approach and in its rate of change as depicted in FIG. 4.

Given the constraints of geometry and dynamics, collision risk will be high when azimuth changes are either constant or decelerating and range decreases are either constant or accelerating, while collision risk will be low when azimuth changes are accelerating and range decreases are decelerating. Collision risk will be moderate under all other conditions or range decreases. These relationships of azimuth and range changes to collision risk are graphically presented in FIG. 4.

The relationships of FIG. 4 can be quantified. One mathematical quantification of risk (P) following the logic above for each point (i) on the azimuth vector that contains a leading edge compute the collision risk potential (P) can be computed according to the following equation:

$$P_{it} = \tan h(\text{risk\_factor} * (\text{range\_risk} + \text{azimuth\_risk})) \qquad [3]$$

Where risk_factor=($\gamma * RV_t / R_t$) where $\gamma$ is some positive constant range_risk=tan h($0.5 + RA_t / RV_t$) when $RV_t > 0.0$, else=0.0 azimuth_risk tan h($0.5 \Theta A_t / \Theta V_t$) when $\Theta V_t > 0.0$; else=1.0

In equation [3], all objects that are approaching (when $RV_t > 0.0$) are assigned a risk that can range from 0.0 to 1.0, based on the relative behavior and locations of the detected objects. Objects that are receding are assigned a collision risk of 0.0.

The ratio of velocity to range ($RV_t/R_t$) provides a risk factor that is proportional to velocity and inversely proportional to range. Due to this risk factor, the relative motion of distant objects will be less risky than the relative motion of nearby objects. Objects that have range but no range velocity will produce a risk factor of 0.0. The constant $\gamma$ also provides a convenient means to change the sensitivity of the system to the range risk factor. For any given closing velocity, increasing $\gamma$ increases the range at which risk values will evoke an avoidance response. For systems that respond slowly or where the object is traveling at a very high velocity, $\gamma$ should be decreased.

Indeed, $\gamma$ does not have to be constant, but may be adaptive with traffic conditions and radar visibility. For example it might be useful to decrease $\gamma$ with dense foreign object traffic, poor visibility, poor road conditions or a heavily loaded host vehicle. The net effect of decreasing $\gamma$ would be to increase stand-off distances because the methods of the present invention will generate a maneuverability recommendation at a lower risk P of collision. At other times, it may be more appropriate to increase $\gamma$ in light traffic condition, or when the host vehicle is extremely maneuverable and is able to react quickly to a collision risk.

All approaching objects will present a positive range velocity ($R_{t-1} - R_t$). Those objects whose relative approach velocities are increasing, an increasing collision risk will be present with a positive acceleration ($RV_t - RV_{t-1}$). Those objects whose relative approach velocities are decreasing will present with negative accelerations, which are indicative of either a tangentially moving object or one that is slowing down while still on a collision course. Negative range acceleration will reduce risk. For purposes of this disclosure, the hyperbolic tangent function (tan h($P_{it}$)) constrains the sum to the interval between 0.0 and 1.0 ($0.0 \leqq P_{it} \leqq 1.0$).

The contribution to the risk equation of azimuth changes is considered only when there is an azimuth change, i.e. when abs$|\Theta_{t-i} - \Theta_t| > 0.0$. In the absence of azimuth change the contribution is 1.0.

When azimuth changes are decelerating, the risk contribution increase is positive, while the contribution of azimuth accelerations is negative. The hyperbolic tangent of the sum of 0.5 and the ratio of azimuth acceleration to azimuth velocity provides a quantification of the contribution of azimuth changes within the range +/−1.0.

Changes in azimuth are indicative of a tangentially moving object, however if the magnitude of these changes decreases over time, the risk of collision may increase. Accelerating azimuth changes (negative difference between azimuth velocities at t−1 and at t) are indicative of objects moving tangentially relative to the host, and tangential movement implies a lower collision risk.

The risk associated with any leading edge at each azimuth is accumulated and preserved over time according to:

$$\text{accumulated\_risk}_t = (\text{accumulated\_risk}_{t-i} + \text{risk}_t)/2 \qquad [4]$$

The accumulated risk for each leading edge provides a running average of the risk associated with that leading edge over time.

The methods of the present invention may include the step of calculating steering and/or acceleration/deceleration commands based on leading edge risks and locations. The requirement for an avoidance response becomes manifest when the accumulated risk of any leading edge exceeds some threshold. The threshold is a real number greater than zero and less than 1.0. The magnitude of the threshold is a representation of the user's tolerance for risk. Higher thresholds permit closer approaches before the evocation of an avoidance response; lower thresholds provide a lower tolerance of risk, perhaps to immobility of the host vehicle, for example. In the examples that follow, the threshold in the present simulations is set at 0.3.

The accumulated risk assessments $P_{it}$ for each leading edge (LE) are preserved in the linked lists for each azimuth location that is correlated with the leading edge at different points in time. Thus, when an object is present at time t, its leading edge azimuth is given by its location in the time/azimuth matrix on the azimuth vector at t, while its range and accumulated risk assessment are linked to that address. In addition, a list of azimuth locations, ranges, and risk assessments is linked to each azimuth vector at t that contains a leading edge. An example of the accumulated risk assessment data contained in these linked lists is shown in Table 3 for four leading edges.

TABLE 3

| Time\Le | a | - - - | b | - - - | c | - - - | d | — |
|---|---|---|---|---|---|---|---|---|
| t | 0.3574 | | 0.2432 | | 0.1900 | | 0.2436 | |
| t − 1 | 0.2544 | | 0.1969 | | 0.0100 | | 0.2849 | |
| t − 2 | 0.2268 | | 0.1929 | | 0.2003 | | 0.2877 | |
| t − 3 | 0.1367 | | 0.1604 | | 0.0977 | | 0.2748 | |

In the example above, the object a is an immediate collision risk as it exceeds the threshold, while the object at b is accumulating risk more slowly; the object at c has a low correlation with time; and the object at d is of no immediate collision risk. Thus, with an adequate sampling rate, the leading edge of each object will have a history of similar risk assessments. These risk assessments may traverse different azimuths with increasing, decreasing, or constant values. In this manner, the use of a threshold against which each accumulated risk assessment at time t is compared is used to alert the system to an impending collision risk.

An automatic driver-assisted control system would use the risk assessments to prioritize one or more control maneuvers to avoid a collision. Or, the options available to a moving host vehicle might include accelerations or decelerations on the host vehicle's X and Y coordinates. The automatic control system could also warn the vehicle driver, flash the vehicle lights, and/or sound the vehicle horn, although none of these last actions of themselves will necessarily eliminate or reduce the collision risk.

The primary objective of the methods of the present invention is to direct the host on a vector that mitigates the risk generating motion of the obstacle below the predetermined threshold. The permissible changes in host velocity are limited by the forces of momentum and the motion degrees of freedom of the vehicle. For example, instantaneous reversals of momentum are disallowed, and many vehicles are not capable of omni-directional steering. If initial allowed maneuvers fail to eliminate certain collision risks, the present method will repeatedly reassess the risks and attempt to further avoid collisions.

Because the system is reactive, it attempts to counter any collision risk with a control command that would move the host vehicle away from the source of the risk in a direction identified by Θ. For example a risk at 2π would generate a control command for host movement in the direction of π. The translation of this direction command into Y and X components of the vector is shown in Table 4:

TABLE 4

| Control Decisions in a Complex Environment | | | | | | | | |
|---|---|---|---|---|---|---|---|---|
| 1 Θ | n | 3π/4 | π/2 | π/4 | 2π | 7π/4 | 3π/2 | 5π/4 |
| 2 cos Θ | −1.000 | −0.707 | 0.000 | 0.707 | 1.000 | 0.707 | 0.000 | −0.707 |
| 3 Sin Θ | 0.000 | 0.707 | 1.000 | 0.707 | 0.000 | −0.707 | −1.000 | −0.707 |
| 4 Θ + π | 2π | 7π/4 | 3π/2 | 5π/4 | π | 3π/4 | π/2 | π/4 |
| 5 cos(Θ + π) | 1.000 | 0.707 | 0.000 | −0.707 | −1.000 | −0.707 | 0.000 | 0.707 |
| 6 Sin(Θ + π) | 0.000 | −0.707 | −1.000 | −0.707 | 0.000 | 0.707 | 1.000 | 0.707 |

In the coordinate system of the host vehicle shown in FIG. 1, where the host vehicle's X axis is located orthogonal to the direction of travel (n/2–0–3n/2) and the Y axis is located in the direction of travel, acceleration on Y axis would be determined by the cos(Θ+π) while the acceleration on X would be determined by the sin(Θ+π). For example, a collision risk at theta of 7π/4 radians would generate a control command to move the vehicle in the direction of 3π/4 radians according to the entries in rows 5 and 6 of Table 4. In our coordinate system used for Table 4, negative sine of theta indicates a necessary turn to the left, while a positive sine of theta indicates a necessary turn to the right.

In the event that several obstacles will be present simultaneously and pose different levels of collision risk, the final control command must accommodate the collective risk in determining the optimal decision to minimize risk.

This may be accomplished by taking the vector sum of all detected targets weighted by their accumulated risk assessments. The X coordinate of each vector is P*sin(Θ+π), while the Y coordinate is P*cos(Θ+π). The vector sum of the coordinates is the sum of these products. This also determines the net control commands.

For example, at some time t, assume the presence of three obstacles (A, B, and C) with the given locations on the azimuth vector and risk assessments ($P_i$), as in the Table 5:

TABLE 5

| LE | Θ | P | cos(Θ + π) | sin(Θ + π) | P* cos(Θ + π) | P* sin(Θ + π) |
|---|---|---|---|---|---|---|
| A | 7π/4 | 0.8874 | −0.707 | −0.707 | −0.627 | −0.627 |
| B | π/32 | 0.6132 | −0.995 | 0.098 | −0.610 | 0.060 |
| C | π | 0.5000 | 1.000 | 0.000 | 0.500 | 0.000 |
| Σ | | 2.0006 | | | −0.737 | −0.563 |

The optimal control command that would avoid all three obstacles is the vector sum for Y and X given in the last two columns, −0.737 and −0.563, respectively. In this example, the optimal collision avoidance strategy would be to decelerate on the Y axis while turning to the left. The turn angle is given by the $$\text{turn angle}=\arctan(Y/X) \quad [5]$$

The acceleration is given by the magnitude of the vector.

$$\text{acceleration}=\text{sqrt}(Y^2+X^2) \quad [6]$$

where the sign of Y (+/−) determines acceleration or deceleration respectively.

In the example of the vehicles shown in FIG. 3, the deceleration of the host vehicle 302 on Y would avoid the imminent collision with obstacle 306, and reduce the likelihood of a collision with the obstacle 304 even further. The reasons for this is because based in the data in Table 2, host vehicle 302 is traveling in the same direction as obstacle 304, and vehicle 302 is either at the same speed as obstacle 304 or overtaking obstacle 304 very slowly. In either case, the risk of collision P with obstacle 304 is small, or at least much smaller than between host vehicle 302 and obstacle 306. Note also that while the turn to the left would avoid both obstacle 306 and obstacle 304. However, if pursued without reassessment this control command could possibly bring the host vehicle into a collision course with obstacle 308, which would be approaching in the lane to the left.

The methods of the present invention include the step of executing the host vehicle control commands and then continuously repeating the entire method. Additional rules may be applied to accommodate passenger comfort and the safe handling of the vehicle under adverse road conditions. The effects of the execution of the collision avoidance commands are immediately assessed by the disclosed processes. The continuous sensing and analyzing of the ranges and azimuths of the various obstacles that might be present in the host vehicle's environment permit not only the application of additional control rules as indicated above, but a near-real-time fine tuning of the execution parameters, such as steering angle, and rates of acceleration and deceleration. This continuous process is best suited for an environment that is continuously changing.

The methods described herein are based upon a host-centric perspective on the environment. From this host-centric perspective, any motion of the host is immediately apparent in changes in the sensed ranges and azimuths of the environmental features that are attributable to either moving or stationary obstacles. No distinctions have to be made between stationary or moving obstacles, as both can present collision risks when the host is moving through the environment. The objective of the host-centric collision avoidance decision rules is to determine what accelerations/decelerations on the host vehicle's X and Y axes are required to get the environmental obstacles to move out away from the host. The information used to make these decisions is available completely from the range and azimuth data provided by an organic (host-based) omni-directional sensor such as a phased-array RADAR, LIDAR, or an optical range-finding system.

Figure 5:
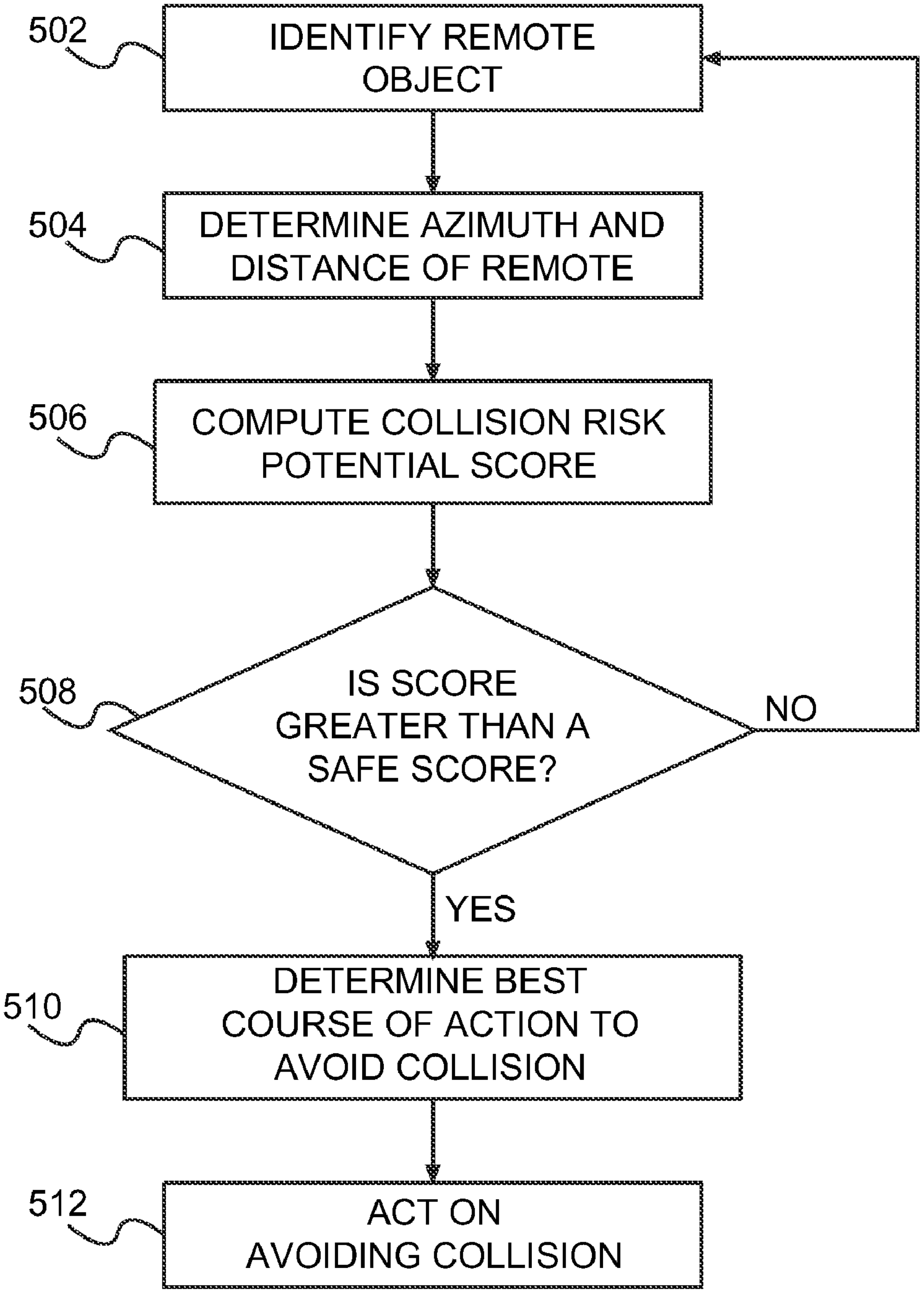
FIG. 5 is a flow chart showing a method of decision making.
Figure 6:
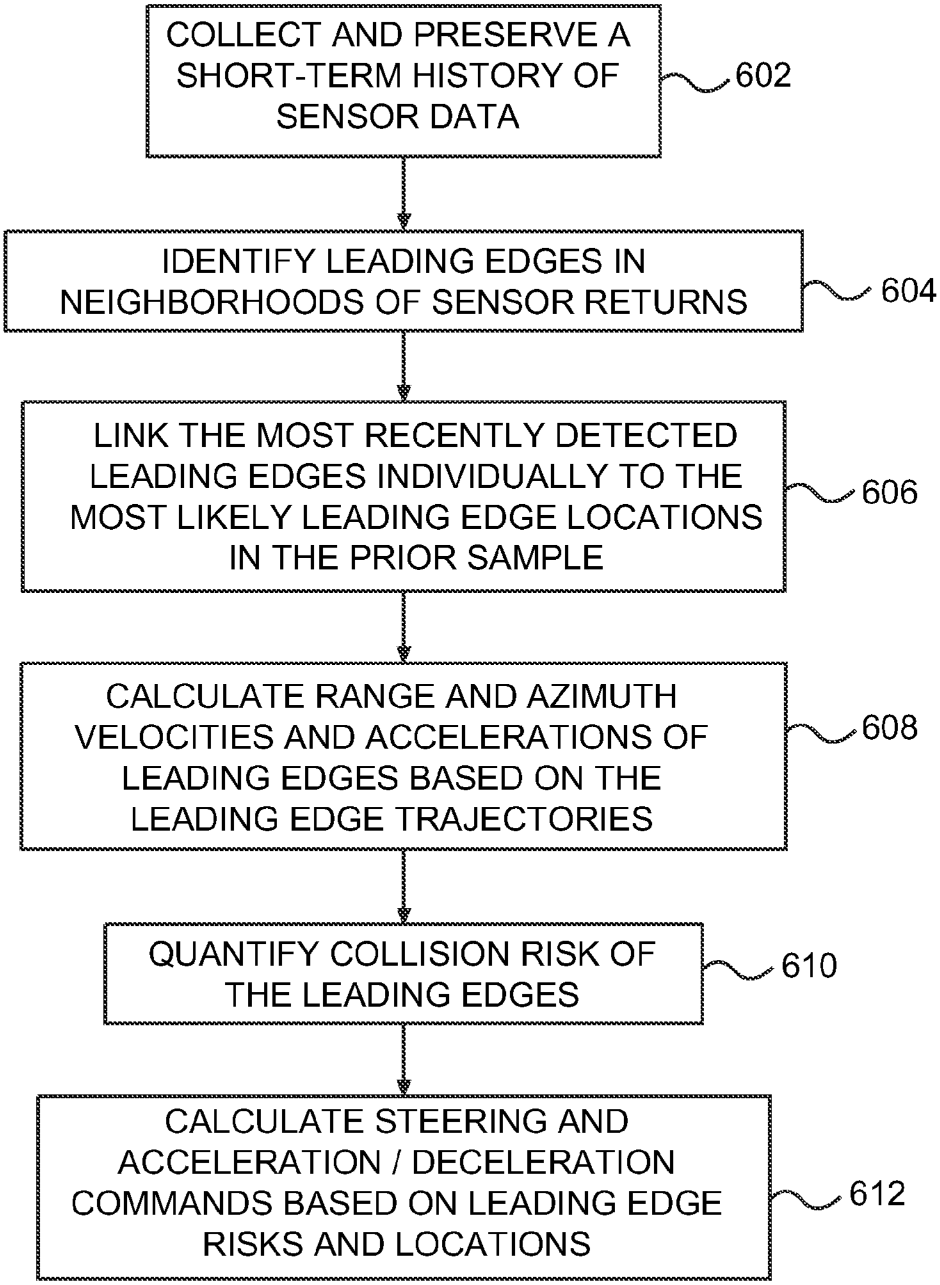
FIG. 6 is a flow chart showing an alternative method of decision making.

The flow charts of FIGS. 5 and 6 depict methods of decision making based on the disclosed subject matter that is cited above. As shown in FIG. 5, a system operating in accordance with the disclosed method identifies a remote object at step 502 and determines azimuth and distance (range) characteristics of the remote object relative to the host vehicle at step 504. At step 506, the system will compute the collision risk potential score in accordance with the disclosure above and compare that collision risk potential score with a predetermined value (a "safe" score) or threshold at step 508. If the value is not greater than a maximum score as shown in step 508, the system will continue repeating steps 502 through 508. However, if the score is greater than a maximum score, the system, at step 510, will determine the best course of action to avoid a collision with the remote object and then, at step 512, act on avoiding a collision with that foreign object in accordance with the processes recited above at step 512.

A system operating in accordance with the method shown in FIG. 6 collects and preserves a short-term history of sensor data at step 602 wherein the sensor data represents objects foreign to a host vehicle. At step 604, the system identifies leading edges in the sensor returns and, at step 606, links the most recently detected leading edge to a leading edge in the prior sample (from the previous time cycle) that most likely represents the same object according to Equation [3] cited above. At step 608, the system calculates range and azimuth velocities and accelerations of leading edges based on the leading edge trajectories evident from the linked lists produced in step 606. Based in this information, the system quantifies the collision risk of the leading edges with the host vehicle and then, at step 612, calculates the most favorable collision avoiding steering and acceleration/deceleration commands based on the vector sum of risk and trajectory information representing the high risk obstacles.

This method applies to both static and moving objects. This method applies to objects with transient or consistent relative trajectories. This method applies to objects with curvilinear or linear relative trajectories, and this method also applies to objects with constant or varying relative velocities. This method applies to objects at all relative azimuths. This method applies to objects at all relative ranges that are detectable by the host sensors. This method applies to all sensors that can detect range and azimuth, such as RADAR, LIDAR, SONAR, and stereo vision. This method is applicable to a 1-D geometry (as in conventional adaptive cruise control), a 2-D geometry (as in FIGS. 2-6), or a 3-D geometry when elevation is added to azimuth as a conditional factor (as in an aerospace or underwater environment). Higher resolution sensors with respect to range and azimuth or elevation will improve the utility of this method.

The present method calculates for each moment in time a collision avoidance solution based on the vector sum of the critical obstacle trajectories. The vector sum method guarantees an optimal solution for each sample of range and azimuth data. The present method is unconcerned with the calculation of a multi-step collision-free path through a dynamic environment and thus may direct the host vehicle toward a region of space that is presently occupied, but at present is a sub-threshold risk due to that region's behavior, in order to reduce the net collision risk due to higher risk obstacles looming from other directions.

The present method may be implemented in a completely automatic mode, or integrated with host vehicle operator commands to permit the execution of operator-generated decisions while the method assists with collision risk reduction in response to high risk conditions. This is feasible in the present process because collision risk is quantified for all possible risk events.

Any host-based sensor that provides range and azimuth data over time can be used with the present processes. Any moving vehicle can host the equipment and algorithms necessary to implement the present risk assessment methodology, including automobiles, robots, airplanes, boats, and space craft. Any steering implementation, including conventional front-wheel, rear-wheel, or omni-directional, can be used with the collision avoidance method as described herein.

I claim:

1. A host vehicle having a plurality of sensors that provide coverage over an entire azimuth around said host vehicle, said host vehicle having a processor that cooperates with said plurality of sensors to perform a method of quantifying a collision risk of said host vehicle with remote objects over said entire azimuth, said method comprising the steps of:

A) collecting and preserving a short-term history of sensor trajectory data, velocity data, acceleration data and range data and azimuth data pertaining to said objects;

B) identifying leading edges of remote objects according to the minima of said range data and said azimuth data from said step A);

C) linking the most recently identified said leading edges from said step B) individually to said leading edges stored in said short-term history to define said trajectory data of said remote objects based on a frame of reference relative to said host vehicle;

D) calculating said velocity data and said acceleration data of said leading edges based on said trajectory data;

E) quantifying collision risk of the host vehicle with said leading edges to establish a risk value; and F) determining an evasive maneuver for said host vehicle based on a vector sum of high risk leading edge risks and locations if the collision risk is above said predetermined risk value from said step E).

2. The vehicle as recited in claim 1 wherein step F) from said method further comprises the step of:

F1) calculating steering commands.

3. The vehicle as recited in claim 1 wherein step F) from said method further comprises the step of:

F2) calculating acceleration/deceleration commands.

4. The vehicle as recited in claim 2, wherein said method further comprises the step of:

G) calculating minimum risk velocities when no avoidance maneuver is possible.

5. The vehicle as recited in claim 4 wherein said step E) of said method further comprises the step of:

E1) adjusting a ratio of a closing velocity and a range from the foreign object at which said risk value will execute said host vehicle control commands.

6. The vehicle as recited in claim 5 wherein said range from the foreign object is adjusted by multiplying said quantified collision risk by a constant.

* * * * *